(12) United States Patent
Ryu et al.

(10) Patent No.: US 9,798,172 B2
(45) Date of Patent: Oct. 24, 2017

(54) MOBILE TERMINAL AND FABRICATING METHOD THEREOF

(71) Applicant: LG ELECTRONICS INC., Seoul (KR)

(72) Inventors: Sangjo Ryu, Seoul (KR); Seungmin Seen, Seoul (KR); Giljae Lee, Seoul (KR); Jongin Im, Seoul (KR); Haengchul Kwak, Seoul (KR); Jongseok Park, Seoul (KR); Kyunghee Yoo, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 14/626,747

(22) Filed: Feb. 19, 2015

(65) Prior Publication Data

US 2015/0253615 A1    Sep. 10, 2015

Related U.S. Application Data

(60) Provisional application No. 61/948,330, filed on Mar. 5, 2014.

(30) Foreign Application Priority Data

May 30, 2014    (KR) .................. 10-2014-0066405

(51) Int. Cl.
   *G02F 1/1333*    (2006.01)
   *G02F 1/1335*    (2006.01)

(52) U.S. Cl.
   CPC .. *G02F 1/133308* (2013.01); *G02F 1/133512* (2013.01); *G02F 1/133553* (2013.01); *G02F 1/133602* (2013.01); *G02F 2001/13332* (2013.01); *G02F 2001/133314* (2013.01); *G02F 2001/133317* (2013.01); *G02F 2001/133331* (2013.01)

(58) Field of Classification Search
   CPC ................................................ G02F 1/133308
   See application file for complete search history.

(56) References Cited

U.S. PATENT DOCUMENTS

2007/0165170 A1    7/2007  Fukuda
2009/0015747 A1    1/2009  Nishizawa et al.
2009/0091681 A1*   4/2009  Nishizawa ........ G02F 1/133308
                                                      349/58

(Continued)

FOREIGN PATENT DOCUMENTS

EP          2664957 A1    11/2013
JP          2010-109760 A  5/2010

*Primary Examiner* — Edmond Lau
(74) *Attorney, Agent, or Firm* — Birch, Stewart, Kolasch & Birch, LLP

(57) ABSTRACT

A mobile terminal includes a liquid crystal panel, a backlight unit that is disposed on a rear surface of the liquid crystal panel and configured to emit light toward the liquid crystal panel, a window that is disposed to cover the liquid crystal panel and formed in a curved shape along one direction, and a frame that is configured to support the window, wherein the liquid crystal panel is attached onto a rear surface of the window and changed into a curved shape to correspond to the curved window, and wherein the backlight unit is attached onto the frame and formed in a curved shape to correspond to the curved liquid crystal panel.

18 Claims, 9 Drawing Sheets

(56) References Cited

U.S. PATENT DOCUMENTS

| | | |
|---|---|---|
| 2009/0303408 A1 | 12/2009 | Huang et al. |
| 2010/0073593 A1 | 3/2010 | Sasaki et al. |
| 2010/0231837 A1* | 9/2010 | Harada ............. G02F 1/133308 349/122 |
| 2012/0039091 A1 | 2/2012 | Lee et al. |
| 2012/0063168 A1* | 3/2012 | Nambu ................ G02B 6/0031 362/609 |
| 2012/0099257 A1 | 4/2012 | Hsu et al. |
| 2012/0281381 A1* | 11/2012 | Sanford ................ G06F 1/1626 361/807 |
| 2013/0342971 A1 | 12/2013 | Jacobs et al. |
| 2014/0009914 A1 | 1/2014 | Cho et al. |
| 2014/0118269 A1* | 5/2014 | Kim ........................ G06F 3/044 345/173 |

* cited by examiner

MOBILE TERMINAL AND FABRICATING METHOD THEREOF

CROSS-REFERENCE TO RELATED APPLICATION

Pursuant to 35 U.S.C. §119, this application claims the benefit of U.S. Provisional Application No. 61/948,330, filed on Mar. 5, 2014, and also claims the right of priority to Korean Application No. 10-2014-0066405, filed on May 30, 2014, the contents of which are all incorporated by reference herein in their entireties.

BACKGROUND OF THE DISCLOSURE

1. Field of the Disclosure

This specification relates to a mobile terminal having a display unit in a curved shape.

2. Background of the Disclosure

Terminals may be divided into mobile/portable terminals and stationary terminals according to their mobility. Also, the mobile terminals may be classified into handheld terminals and vehicle mount terminals according to whether or not a user can directly carry.

Mobile terminals (or electronic devices) may be configured to perform various functions, for example, data and voice communication, capturing images or video, storing voice, reproducing music files via a speaker system, displaying images or video and the like. Some of mobile terminals may include an additional function of playing electronic games, and other mobile terminals may be implemented as multimedia players. In addition, in recent time, mobile terminals can receive multicast signals to allow viewing of visual contents, such as broadcasting, video or television programs.

As it becomes multifunctional, a mobile terminal can be allowed to capture still images or moving images, play music or video files, play games, receive broadcast and the like, so as to be implemented as an integrated multimedia player.

Furthermore, many efforts are undergoing to support or enhance various functions of such mobile terminals. Such many efforts include changes and improvement of structural components implementing a mobile terminal and/or software or hardware improvement.

In view of the improvements of the structural components, mobile terminals are evolving into various design shapes. Accordingly, a mobile terminal with a display unit in a curved shape is attracting attention. In response to such attention to the curved display unit, active researches on a device structure focusing on the curved display unit are undergoing.

SUMMARY OF THE DISCLOSURE

Therefore, an aspect of the detailed description is to provide a structure capable of implementing the conventional flat display into a curved display.

Another aspect of the detailed description is to provide a new device structure focusing on a curved display unit.

To achieve these and other advantages and in accordance with the purpose of this specification, as embodied and broadly described herein, there is provided a mobile terminal including a liquid crystal panel, a backlight unit that is disposed on a rear surface of the liquid crystal panel and configured to emit light toward the liquid crystal panel, a window that is disposed to cover the liquid crystal panel and formed in a curved shape along one direction, and a frame that is configured to support the window. The liquid crystal panel may be attached onto a rear surface of the window and changed into a curved shape to correspond to the curved window, and the backlight unit may be attached onto the frame and formed in a curved shape to correspond to the curved liquid crystal panel.

In accordance with one embodiment disclosed herein, a bottom surface of the frame with the backlight unit attached thereto may be formed in a curved shape along the one direction.

The backlight unit may receive a bending force applied thereto due to the curved shape of the bottom surface.

The backlight unit may be fabricated in a curved shape along the one direction, or changed into the curved shape along the one direction before being attached onto the frame.

In accordance with another embodiment disclosed herein, a rear surface supporting portion of the frame supporting the window may be provided with a bonding portion configured to couple the window to the frame. The bonding portion may include an adhesive tape that is attached onto both sides of the rear surface supporting portion and extends along the one direction, and a bonding layer that is coated on both ends of the window.

In accordance with another embodiment disclosed herein, the frame may include a base frame that is coupled to the window, and a middle frame that is made of a metal and integrally coupled with the base frame through insert-injection. The middle frame may then be coupled to the backlight unit.

The base frame may be externally exposed to define an appearance of side surfaces of a terminal main body.

The mobile terminal may further include a printed circuit board that is coupled to the base frame and configured to support the middle frame by covering a rear surface of the middle frame.

The base frame may include a rear surface supporting portion that is configured to support a rear surface of the window, and a side surface covering portion that is disposed to cover side surfaces of the window. A bonding layer for coupling the window to the base frame may be provided between the rear surface of the window and the rear surface supporting portion and between the side surfaces of the window and the side surface covering portion, respectively.

An inclined guide portion may be formed between the rear surface supporting portion and the side surface covering portion, to allow the bonding layer coated on the rear surface supporting portion to be introduced to the side surface covering portion when the window is coupled to the base frame.

The mobile terminal may further include a reflecting portion that is disposed within the frame to surround the backlight unit and configured to reflect light leaked from the backlight unit.

The reflecting portion may be a reflecting layer that is coated on at least a part of an inner side of the frame and contains a material having a characteristic of reflecting light.

The reflecting layer may be coated on an inner wall of the base frame, which faces the side surface of the backlight unit, and a bottom surface of the middle frame.

The reflecting portion may be a reflection member that is coupled to the frame to surround the side surfaces of the backlight unit. The reflection member may be made of white-based synthetic resin which reflects light.

The reflection member may be disposed on an edge portion between the base frame and the middle frame.

The reflection member may be integrally coupled with the frame through double-injection or triple-injection.

A shielding member may be provided between the liquid crystal panel and the backlight unit, so as to prevent a leakage of light from the backlight unit.

The shielding member may be disposed to cover an upper edge of the backlight unit and the reflection member.

The shielding member may be formed of a material which is elastically deformable, and closely adhered onto the liquid crystal panel and the backlight unit, respectively, to prevent an introduction of foreign materials between the liquid crystal panel and the backlight unit.

To achieve these and other advantages and in accordance with the purpose of this specification, as embodied and broadly described herein, there is provided a method for fabricating a mobile terminal, the method including attaching a liquid crystal panel on a rear surface of a window, which is formed in a curved shape along one direction, such that the liquid crystal panel is changed into a curved shape, attaching a backlight unit, which emits light toward the liquid crystal panel, onto a frame, and coupling the window with the liquid crystal panel attached thereto to the frame with the backlight unit attached thereto.

Further scope of applicability of the present application will become more apparent from the detailed description given hereinafter. However, it should be understood that the detailed description and specific examples, while indicating preferred embodiments of the disclosure, are given by way of illustration only, since various changes and modifications within the spirit and scope of the disclosure will become apparent to those skilled in the art from the detailed description.

BRIEF DESCRIPTION OF THE DRAWINGS

The accompanying drawings, which are included to provide a further understanding of the disclosure and are incorporated in and constitute a part of this specification, illustrate exemplary embodiments and together with the description serve to explain the principles of the disclosure.

In the drawings.

DETAILED DESCRIPTION OF THE DISCLOSURE

Hereinafter, the present disclosure will be explained in more detail with reference to the attached drawings. For the sake of brief description with reference to the drawings, the same or equivalent components will be provided with the same reference numbers, and description thereof will not be repeated. The terms "module", "unit" or "portion" for components used in the following description merely provided only for facilitation of preparing this specification, and thus they are not granted a specific meaning or function. If it is regarded that detailed descriptions of the related art are not within the range of the present invention, the detailed descriptions will be omitted. Furthermore, it should also be understood that embodiments are not limited by any of the details of the foregoing description, but rather should be construed broadly within its spirit and scope and it is intended that the present invention cover modifications and variations of this invention provided they come within the scope of the appended claims and their equivalents.

It will be understood that although the terms first, second, etc. may be used herein to describe various elements, these elements should not be limited by these terms. These terms are generally only used to distinguish one element from another.

It will be understood that when an element is referred to as being "connected with" another element, the element can be connected with the other element or intervening elements may also be present. In contrast, when an element is referred to as being "directly connected with" another element, there are no intervening elements present.

A singular representation may include a plural representation unless it represents a definitely different meaning from the context.

Terms such as "include" or "has" are used herein and should be understood that they are intended to indicate an existence of several components, functions or steps, disclosed in the specification, and it is also understood that greater or fewer components, functions, or steps may likewise be utilized.

Mobile terminals presented herein may be implemented using a variety of different types of terminals. Examples of such terminals include cellular phones, smart phones, user equipment, laptop computers, digital broadcast terminals, personal digital assistants (PDAs), portable multimedia players (PMPs), navigators, portable computers (PCs), slate PCs, tablet PCs, ultra books, wearable devices (for example, smart watches, smart glasses, head mounted displays (HMDs)), and the like.

By way of non-limiting example only, further description will be made with reference to particular types of mobile terminals. However, such teachings apply equally to other types of terminals, such as those types noted above. In addition, these teachings may also be applied to stationary terminals such as digital TV, desktop computers, and the like.

Figure 1:
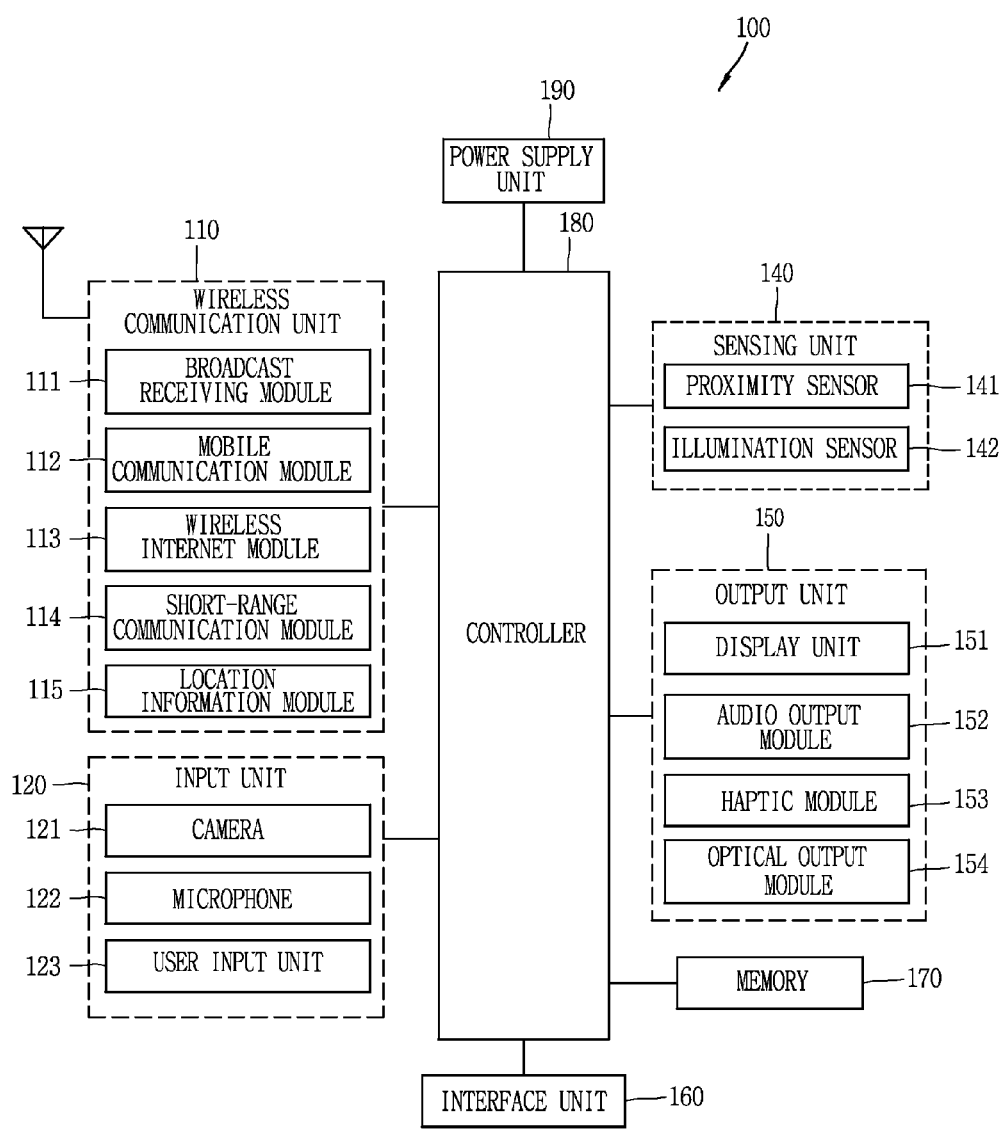
FIG. 1 is a block diagram of a mobile terminal in accordance with one exemplary embodiment of the present disclosure.

FIG. 1 is a block diagram of a mobile terminal 100 in accordance with one exemplary embodiment of the present disclosure.

The mobile terminal 100 is shown having components such as a wireless communication unit 110, an input unit 120, a sensing unit 140, an output unit 150, an interface unit 160, a memory 170, a controller 180, and a power supply unit 190. It is understood that implementing all of the illustrated components is not a requirement, and that greater or fewer components may alternatively be implemented.

In more detail, among those components, the wireless communication unit 110 may typically include one or more modules which permit communications such as wireless communications between the mobile terminal 100 and a wireless communication system, communications between the mobile terminal 100 and another mobile terminal, communications between the mobile terminal 100 and an external server.

The wireless communication unit 110 may include at least one of a broadcast receiving module 111, a mobile communication module 112, a wireless Internet module 113, a short-range communication module 114, a location information module 115 and the like.

The input unit 120 may include a camera 121 (or an image input device) for an image signal input, a microphone 122 (or an audio input device) for an audio signal input, and a user input unit 123 (for example, a touch key, a push key, and the like) for allowing a user to input information. Data (for example, audio, image, and the like) is obtained by the input unit 120 and may be analyzed and processed according to user commands.

The sensing unit 140 is typically implemented using one or more sensors configured to sense internal information of the mobile terminal, the surrounding environment of the mobile terminal, user information, and the like. For example, the sensing unit 140 is shown having a proximity sensor 141, an illumination sensor 142, a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, camera 121), a microphone 122, a battery gauge, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like). The mobile terminal 100 may be configured to utilize information obtained from the sensing unit 140, and in particular, information obtained from at least two sensors of the sensing unit 140, and combinations thereof.

The output unit 150 is typically configured to output various types of information, such as audio, video, tactile output, and the like. The output unit 150 is shown having a display unit 151, an audio output module 152, a haptic module 153, and an optical output module 154. The display unit 151 may have an inter-layered structure or an integrated structure with a touch sensor in order to facilitate a touch screen. The touch screen may provide an output interface between the mobile terminal 100 and a user, as well as function as the user input unit 123 which provides an input interface between the mobile terminal 100 and the user.

The interface unit 160 serves as an interface with various types of external devices that can be coupled to the mobile terminal 100. The interface unit 160, for example, may include any of wired or wireless ports, external power supply ports, wired or wireless data ports, memory card ports, ports for connecting a device having an identification module, audio input/output (I/O) ports, video I/O ports, earphone ports, and the like. In some cases, the mobile terminal 100 may perform assorted control functions associated with a connected external device, in response to the external device being connected to the interface unit 160.

The memory 170 is typically implemented to store data to support various functions or features of the mobile terminal 100. For instance, the memory 170 may be configured to store application programs (or applications) executed in the mobile terminal 100, data or instructions for operations of the mobile terminal 100, and the like. Some of these application programs may be downloaded from an external server via wireless communication. Other application programs may be installed within the mobile terminal 100 at time of manufacturing or shipping, which is typically the case for basic functions of the mobile terminal 100 (for example, receiving a call, placing a call, receiving a message, sending a message, and the like). It is common for application programs to be stored in the memory 170, installed in the mobile terminal 100, and executed by the controller 180 to perform an operation (or function) for the mobile terminal 100.

The controller 180 typically functions to control overall operations of the mobile terminal 100, in addition to the operations associated with the application programs. The controller 180 may provide or process information or functions appropriate for a user by processing signals, data, information and the like, or activating application programs stored in the memory 170.

Also, the controller 180 may control some or all of the components illustrated in FIG. 1A according to the execution of an application program that have been stored in the memory 170. In addition, the controller 180 may combine two or more components included in the mobile terminal 100 for operation to activate the application program.

The power supply unit 190 can be configured to receive external power or provide internal power in order to supply appropriate power required for operating elements and components included in the mobile terminal 100. The power supply unit 190 may include a battery, and the battery may be configured to be embedded in the terminal body, or configured to be detachable from the terminal body.

At least some of those components may be combined for operation to implement an operation, a control or a control method of the mobile terminal according to various embodiments disclosed herein. Also, the operation, the control or the control method of the mobile terminal may be implemented on the mobile terminal by activating at least one application program stored in the memory 170.

Hereinafter, prior to describing various exemplary embodiments implemented by the mobile terminal 100, each of the aforementioned components will be described in more detail with reference to FIG. 1.

Regarding the wireless communication unit 110, the broadcast receiving module 111 is typically configured to receive a broadcast signal and/or broadcast associated information from an external broadcast managing entity via a broadcast channel. The broadcast channel may include a satellite channel, a terrestrial channel, or both. In some embodiments, two or more broadcast receiving modules may be utilized to facilitate simultaneously receiving of two or more broadcast channels, or to support switching among broadcast channels.

The mobile communication module 112 can transmit and/or receive wireless signals to and from one or more network entities. Typical examples of a network entity include a base station, an external mobile terminal, a server, and the like. Such network entities form part of a mobile communication network, which is constructed according to technical standards or communication methods for mobile communications (for example, Global System for Mobile Communication (GSM), Code Division Multi Access (CDMA), Wideband CDMA (WCDMA), High Speed Downlink Packet access (HSDPA), Long Term Evolution (LTE), and the like).

Examples of wireless signals may include audio call signals, video (telephony) call signals, or various formats of data to support communication of text and multimedia messages.

The wireless Internet module 113 is configured to facilitate wireless Internet access. This module may be internally or externally coupled to the mobile terminal 100. The wireless Internet module 113 may transmit and/or receive wireless signals via communication networks according to wireless Internet technologies.

Examples of such wireless Internet access include Wireless LAN (WLAN), Wireless Fidelity (Wi-Fi) Direct, Digital Living Network Alliance (DLNA), Wireless Broadband (WiBro), Worldwide Interoperability for Microwave Access (WiMAX), High Speed Downlink Packet Access (HSDPA), Long Term Evolution (LTE), and the like. The wireless Internet module 113 may transmit/receive data according to one or more of such wireless Internet technologies, and other Internet technologies as well.

In some embodiments, when the wireless Internet access is implemented according to, for example, WiBro, HSDPA, GSM, CDMA, WCDMA, LTE, and the like, as part of a mobile communication network, the wireless Internet module 113 performs such wireless Internet access. As such, the Internet module 113 may cooperate with, or function as, the mobile communication module 112.

The short-range communication module 114 is configured to facilitate short-range communications. Suitable technologies for implementing such short-range communications include BLUETOOTH™, Radio Frequency IDentification (RFID), Infrared Data Association (IrDA), Ultra-WideBand (UWB), ZigBee, Near Field Communication (NFC), Wireless-Fidelity (Wi-Fi), and Wi-Fi Direct. The short-range communication module 114 in general supports wireless communications between the mobile terminal 100 and a wireless communication system, communications between the mobile terminal 100 and another mobile terminal 100, or communications between the mobile terminal and a network where another mobile terminal 100 (or an external server) is located, via near field wireless personal area networks.

In some embodiments, another mobile terminal (which may be configured similarly to mobile terminal 100) may be a wearable device, for example, a smart watch, a smart glass or a head mounted display (HMD), which is able to exchange data with the mobile terminal 100 (or otherwise cooperate with the mobile terminal 100). The short-range communication module 114 may sense or recognize the wearable device, and permit communication between the wearable device and the mobile terminal 100. In addition, when the sensed wearable device is a device which is authenticated to communicate with the mobile terminal 100, the controller 180, for example, may cause transmission of data processed in the mobile terminal 100 to the wearable device via the short-range communication module 114. Hence, a user of the wearable device may use the data processed in the mobile terminal 100 on the wearable device. For example, when a call is received in the mobile terminal 100, the user may answer the call using the wearable device. Also, when a message is received in the mobile terminal 100, the user can check the received message using the wearable device.

The location information module 115 is generally configured to detect, calculate, derive or otherwise identify a position of the mobile terminal. As an example, the location information module 115 includes a Global Position System (GPS) module, a Wi-Fi module, or both. As one example, when the mobile terminal uses a GPS module, a position of the mobile terminal may be acquired using a signal sent from a GPS satellite. As another example, when the mobile terminal uses the Wi-Fi module, a position of the mobile terminal can be acquired based on information related to a wireless access point (AP) which transmits or receives a wireless signal to or from the Wi-Fi module. If necessary, the location information module 115 may perform a function of another module of the wireless communication unit 110, in order to obtain data associated with a location of the mobile terminal in a replacing manner or an additional manner.

The input unit 120 may be configured to permit various types of input to the mobile terminal 120. Examples of such input include audio, image, video, data, and user input. Image and video input is often obtained using one or more cameras 121. Such cameras 121 may process image frames of still pictures or video obtained by image sensors in a video or image capture mode. The processed image frames can be displayed on the display unit 151 or stored in memory 170. In some cases, the cameras 121 may be arranged in a matrix configuration to permit a plurality of images having various angles or focal points to be input to the mobile terminal 100. As another example, the cameras 121 may be located in a stereoscopic arrangement to acquire left and right images for implementing a stereoscopic image.

The microphone 122 processes an external audio signal into electric audio data. The processed audio data may be utilized in various manners according to a currently-executed function (or a currently-executed application program) in the mobile terminal 100. Meanwhile, the microphone 122 may include assorted noise removing algorithms to remove unwanted noise generated in the course of receiving the external audio.

The user input unit 123 is a component that permits input by a user. Such user input may enable the controller 180 to control operation of the mobile terminal 100. The user input unit 123 may include one or more of a mechanical input element (for example, a key, a button located on a front and/or rear surface or a side surface of the mobile terminal 100, a dome switch, a jog wheel, a jog switch, and the like), or a touch-sensitive input element, among others. As one example, the touch-sensitive input element may be a virtual key, a soft key or a visual key, which is displayed on a touch screen through software processing, or a touch key which is located on the mobile terminal at a location that is other than the touch screen. On the other hand, the virtual key or the visual key may be displayed on the touch screen in various shapes, for example, graphic, text, icon, video, or a combination thereof.

The sensing unit 140 is generally configured to sense one or more of internal information of the mobile terminal, surrounding environment information of the mobile terminal, user information, or the like. The controller 180 generally cooperates with the sending unit 140 to control operation of the mobile terminal 100 or execute data processing, a function or an operation associated with an application program installed in the mobile terminal based on the sensing provided by the sensing unit 140. The sensing unit 140 may be implemented using any of a variety of sensors, some of which will now be described in more detail.

The proximity sensor 141 refers to a sensor to sense presence or absence of an object approaching a surface, or an object located near a surface, by using an electromagnetic field, infrared rays, or the like without a mechanical contact. The proximity sensor 141 may be arranged at an inner region of the mobile terminal covered by the touch screen, or near the touch screen. The proximity sensor 141 may have a more extended lifespan and higher utilization than the contact sensor.

The proximity sensor 141, for example, may include any of a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and the like. When the touch screen is implemented as a capacitance type, the proximity sensor 141 can sense proximity of a pointer relative to the touch screen by changes of an electromagnetic field, which is responsive to an approach of an object with conductivity. In this case, the touch screen (touch sensor) may also be categorized as a proximity sensor.

The term "proximity touch" will often be referred to herein to denote the scenario in which a pointer is positioned to be proximate to the touch screen without contacting the touch screen. The term "contact touch" will often be referred to herein to denote the scenario in which a pointer makes physical contact with the touch screen. For the position corresponding to the proximity touch of the pointer relative to the touch screen, such position will correspond to a position where the pointer is perpendicular to the touch screen. The proximity sensor 141 may sense proximity touch, and proximity touch patterns (for example, distance, direction, speed, time, position, moving status, and the like). In general, controller 180 processes data corresponding to proximity touches and proximity touch patterns sensed by the proximity sensor 141, and cause output of visual information on the touch screen. In addition, the controller 180 can control the mobile terminal 100 to execute different operations or process different data according to whether a touch with respect to a point on the touch screen is either a proximity touch or a contact touch.

A touch sensor can sense a touch (or touch input) applied to the touch screen, such as the display unit 151, using any of a variety of touch methods. Examples of such touch methods include a resistive type, a capacitive type, an infrared type, and a magnetic field type, among others.

As one example, the touch sensor may be configured to convert changes of pressure applied to a specific part of the display unit 151, or convert capacitance occurring at a specific part of the display unit 151, into electric input signals. The touch sensor may also be configured to sense not only a touched position and a touched area, but also touch pressure and/or touch capacitance. A touch object is generally used to apply a touch input to the touch sensor. Examples of typical touch objects include a finger, a touch pen, a stylus pen, a pointer, or the like.

When a touch input is sensed by a touch sensor, corresponding signals may be transmitted to a touch controller. The touch controller may process the received signals, and then transmit corresponding data to the controller 180. Accordingly, the controller 180 may sense which region of the display unit 151 has been touched. Here, the touch controller may be a component separate from the controller 180, the controller 180, and combinations thereof.

In some embodiments, the controller 180 may execute the same or different controls according to a type of touch object that touches the touch screen or a touch key provided in addition to the touch screen. Whether to execute the same or different control according to the object which provides a touch input may be decided based on a current operating state of the mobile terminal 100 or a currently executed application program, for example.

The touch sensor and the proximity sensor may be implemented individually, or in combination, to sense various types of touches. Such touches includes a short (or tap) touch, a long touch, a multi-touch, a drag touch, a flick touch, a pinch-in touch, a pinch-out touch, a swipe touch, a hovering touch, and the like.

If desired, an ultrasonic sensor may be implemented to recognize position information relating to a touch object using ultrasonic waves. The controller 180, for example, may calculate a position of a wave generation source based on information sensed by an illumination sensor and a plurality of ultrasonic sensors. Since light is much faster than ultrasonic waves, the time for which the light reaches the optical sensor is much shorter than the time for which the ultrasonic wave reaches the ultrasonic sensor. The position of the wave generation source may be calculated using this fact. For instance, the position of the wave generation source may be calculated using the time difference from the time that the ultrasonic wave reaches the sensor based on the light as a reference signal.

The camera 121 typically includes at least one of a camera sensor (CCD, CMOS etc.), a photo sensor (or image sensors), or a laser sensor.

Implementing the camera 121 with a laser sensor may allow detection of a touch of a physical object with respect to a 3D stereoscopic image. The photo sensor may be laminated on, or overlapped with, the display device. The photo sensor may be configured to scan movement of the physical object in proximity to the touch screen. In more detail, the photo sensor may include photo diodes and transistors at rows and columns to scan content received at the photo sensor using an electrical signal which changes according to the quantity of applied light. Namely, the photo sensor may calculate the coordinates of the physical object according to variation of light to thus obtain position information of the physical object.

The display unit 151 is generally configured to output information processed in the mobile terminal 100. For example, the display unit 151 may display execution screen information of an application program executing at the mobile terminal 100 or user interface (UI) and graphic user interface (GUI) information in response to the execution screen information.

In some embodiments, the display unit 151 may be implemented as a stereoscopic display unit for displaying stereoscopic images.

A typical stereoscopic display unit may employ a stereoscopic display scheme such as a stereoscopic scheme (a glass scheme), an auto-stereoscopic scheme (glassless scheme), a projection scheme (holographic scheme), or the like.

The audio output module 152 is generally configured to output audio data. Such audio data may be obtained from any of a number of different sources, such that the audio data may be received from the wireless communication unit 110 or may have been stored in the memory 170. The audio data may be output during modes such as a signal reception mode, a call mode, a record mode, a voice recognition mode, a broadcast reception mode, and the like. The audio output module 152 can provide audible output related to a particular function (e.g., a call signal reception sound, a message reception sound, etc.) performed by the mobile terminal 100. The audio output module 152 may also be implemented as a receiver, a speaker, a buzzer, or the like.

A haptic module 153 can be configured to generate various tactile effects that a user feels, perceive, or otherwise experience. A typical example of a tactile effect generated by the haptic module 153 is vibration. The strength, pattern and the like of the vibration generated by the haptic module 153 can be controlled by user selection or setting by the controller. For example, the haptic module 153 may output different vibrations in a combining manner or a sequential manner.

Besides vibration, the haptic module 153 can generate various other tactile effects, including an effect by stimulation such as a pin arrangement vertically moving to contact skin, a spray force or suction force of air through a jet orifice or a suction opening, a touch to the skin, a contact of an electrode, electrostatic force, an effect by reproducing the sense of cold and warmth using an element that can absorb or generate heat, and the like.

The haptic module 153 can also be implemented to allow the user to feel a tactile effect through a muscle sensation such as the user's fingers or arm, as well as transferring the tactile effect through direct contact. Two or more haptic modules 153 may be provided according to the particular configuration of the mobile terminal 100.

An optical output module 154 can output a signal for indicating an event generation using light of a light source. Examples of events generated in the mobile terminal 100 may include message reception, call signal reception, a missed call, an alarm, a schedule notice, an email reception, information reception through an application, and the like.

A signal output by the optical output module 154 may be implemented in such a manner that the mobile terminal emits monochromatic light or light with a plurality of colors. The signal output may be terminated as the mobile terminal senses that a user has checked the generated event, for example.

The interface unit 160 serves as an interface for external devices to be connected with the mobile terminal 100. For example, the interface unit 160 can receive data transmitted from an external device, receive power to transfer to elements and components within the mobile terminal 100, or transmit internal data of the mobile terminal 100 to such external device. The interface unit 160 may include wired or wireless headset ports, external power supply ports, wired or wireless data ports, memory card ports, ports for connecting a device having an identification module, audio input/output (I/O) ports, video I/O ports, earphone ports, or the like.

The identification module may be a chip that stores various information for authenticating authority of using the mobile terminal 100 and may include a user identity module (UIM), a subscriber identity module (SIM), a universal subscriber identity module (USIM), and the like. In addition, the device having the identification module (also referred to herein as an "identifying device") may take the form of a smart card. Accordingly, the identifying device can be connected with the terminal 100 via the interface unit 160.

When the mobile terminal 100 is connected with an external cradle, the interface unit 160 can serve as a passage to allow power from the cradle to be supplied to the mobile terminal 100 or may serve as a passage to allow various command signals input by the user from the cradle to be transferred to the mobile terminal there through. Various command signals or power input from the cradle may operate as signals for recognizing that the mobile terminal is properly mounted on the cradle.

The memory 170 can store programs to support operations of the controller 180 and store input/output data (for example, phonebook, messages, still images, videos, etc.). The memory 170 may store data related to various patterns of vibrations and audio which are output in response to touch inputs on the touch screen.

The memory 170 may include one or more types of storage mediums including a Flash memory, a hard disk, a solid state disk, a silicon disk, a multimedia card micro type, a card-type memory (e.g., SD or DX memory, etc), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, an optical disk, and the like. The mobile terminal 100 may also be operated in relation to a network storage device that performs the storage function of the memory 170 over a network, such as the Internet.

The controller 180 may typically control the general operations of the mobile terminal 100. For example, the controller 180 may set or release a lock state for restricting a user from inputting a control command with respect to applications when a status of the mobile terminal meets a preset condition.

The controller 180 can also perform the controlling and processing associated with voice calls, data communications, video calls, and the like, or perform pattern recognition processing to recognize a handwriting input or a picture drawing input performed on the touch screen as characters or images, respectively. In addition, the controller 180 can control one or a combination of those components in order to implement various exemplary embodiments disclosed herein.

The power supply unit 190 receives external power or provides internal power and supplies the appropriate power required for operating respective elements and components included in the mobile terminal 100. The power supply unit 190 may include a battery, which is typically rechargeable or be detachably coupled to the terminal body for charging.

The power supply unit 190 may include a connection port. The connection port may be configured as one example of the interface unit 160 to which an external charger for supplying power to recharge the battery is electrically connected.

As another example, the power supply unit 190 may be configured to recharge the battery in a wireless manner without use of the connection port. In this example, the power supply unit 190 can receive power, transferred from an external wireless power transmitter, using at least one of an inductive coupling method which is based on magnetic induction or a magnetic resonance coupling method which is based on electromagnetic resonance.

Various embodiments described herein may be implemented in a computer-readable medium, a machine-readable medium, or similar medium using, for example, software, hardware, or any combination thereof.

Figure 2:
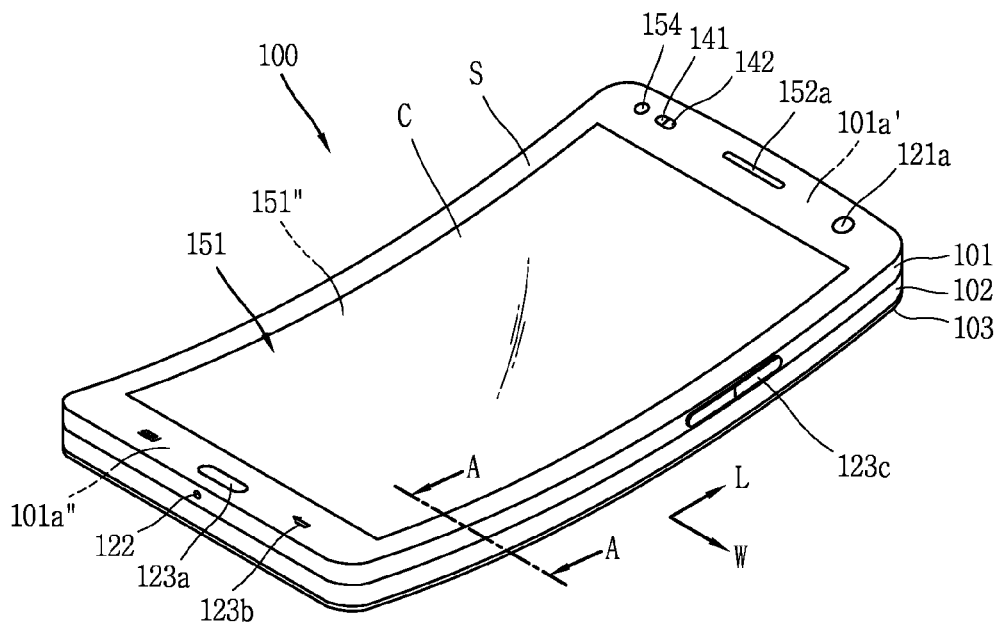
FIGS. 2 and 3 are conceptual views of one example of a mobile terminal, viewed from different directions, in accordance with the present disclosure.
Figure 3:
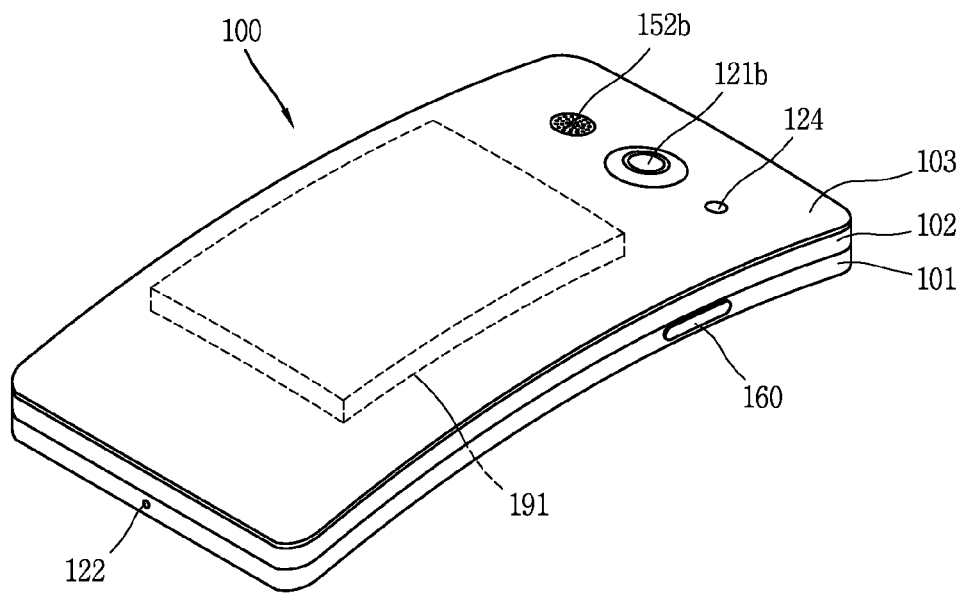

FIGS. 2 and 3 are conceptual views of one example of a mobile terminal, viewed from different directions, in accordance with the present disclosure.

As illustrated in FIGS. 2 and 3, the mobile terminal 100 is described with reference to a bar-type terminal body. However, the mobile terminal 100 may alternatively be implemented in any of a variety of different configurations. Examples of such configurations include watch-type, cliptype, glasses-type, or as a folder-type, flip-type, slide-type, swing-type, and swivel-type in which two and more bodies are combined with each other in a relatively movable manner, and combinations thereof.

Here, regarding the mobile terminal 100 as at least one assembly (or set), the terminal body may be understood as a conception referring to the assembly (or the set).

The mobile terminal 100 will generally include a case (for example, frame, housing, cover, and the like) forming the appearance of the terminal. In this embodiment, the case is formed using a front case 101 and a rear case 102. Various electronic components are incorporated into a space formed between the front case 101 and the rear case 102. At least one middle case may be additionally positioned between the front case 101 and the rear case 102.

The display unit 151 is shown located on the front side of the terminal body to output information. As illustrated, a window 151" of the display unit 151 may be mounted to the front case 101 to form the front surface of the terminal body together with the front case 101.

In some embodiments, electronic components may also be mounted to the rear case 102. Examples of such electronic components include a detachable battery 191, an identification module, a memory card, and the like. Rear cover 103 is shown covering the electronic components, and this cover may be detachably coupled to the rear case 102. Therefore, when the rear cover 103 is detached from the rear case 102, the electronic components mounted to the rear case 102 are externally exposed.

As illustrated, when the rear cover 103 is coupled to the rear case 102, a side surface of the rear case 102 is partially exposed. In some cases, upon the coupling, the rear case 102 may also be completely shielded by the rear cover 103. In some embodiments, the rear cover 103 may include an opening for externally exposing a camera 121b or an audio output module 152b.

The cases 101, 102, 103 may be formed by injection-molding synthetic resin or may be formed of a metal, for example, stainless steel (STS), aluminum (Al), titanium (Ti), or the like.

As an alternative to the example in which the plurality of cases form an inner space for accommodating components, the mobile terminal 100 may be configured such that one case forms the inner space. In this example, a mobile terminal 100 having a uni-body is formed in such a manner that synthetic resin or metal extends from a side surface to a rear surface.

If desired, the mobile terminal 100 may include a waterproofing unit (not shown) for preventing introduction of water into the terminal body. For example, the waterproofing unit may include a waterproofing member which is located between the window 151a and the front case 101, between the front case 101 and the rear case 102, or between the rear case 102 and the rear cover 103, to hermetically seal an inner space when those cases are coupled.

The mobile terminal 100 is shown having a display unit 151, first and second audio output modules 152a and 152b, a proximity sensor 141, an illumination sensor 142, an optical output module 154, first and second cameras 121a and 121b, a first manipulation unit 123a, 123b, a second manipulation unit 123c, a microphone 122, an interface unit 160, and the like.

Hereinafter, description will be given, as illustrated in FIGS. 2 and 3, of an exemplary embodiment of a mobile terminal, in which the display unit 151, the first audio output module 152a, the proximity sensor 141, the illumination sensor 142, the optical output module 154, the first camera 121a and the first manipulation units 123a and 123b are disposed on a front surface of a terminal body, the second manipulation unit 123c, the microphone 122 and the interface unit 160 are disposed on a side surface of the terminal body, and the second audio output module 152b and the second camera 121b are disposed on a rear surface of the terminal body.

However, it is to be understood that alternative arrangements are possible and within the teachings of the instant disclosure. Some components may be omitted or rearranged. For example, the first manipulation unit 123a, 123b may be located on another surface of the terminal body, and the second audio output module 152b may be located on the side surface of the terminal body.

The display unit 151 is generally configured to output information processed in the mobile terminal 100. For example, the display unit 151 may display execution screen information of an application program executing at the mobile terminal 100 or user interface (UI) and graphic user interface (GUI) information in response to the execution screen information.

The display unit 151 outputs information processed in the mobile terminal 100. The display unit 151 may be implemented using one or more suitable display devices. Examples of such suitable display devices include a liquid crystal display (LCD), a thin film transistor-liquid crystal display (TFT-LCD), an organic light emitting diode (OLED), a flexible display, a 3-dimensional (3D) display, an e-ink display, and combinations thereof.

The display unit 151 may be implemented using two display devices, which can implement the same or different display technology. For instance, a plurality of the display units 151 may be arranged on one side, either spaced apart from each other, or these devices may be integrated, or these devices may be arranged on different surfaces.

The display unit 151 may also include a touch sensor which senses a touch input received at the display unit. When a touch is input to the display unit 151, the touch sensor may be configured to sense this touch and the controller 180, for example, may generate a control command or other signal corresponding to the touch. The content which is input in the touching manner may be a text or numerical value, or a menu item which can be indicated or designated in various modes.

The touch sensor may be configured in a form of a film having a touch pattern, disposed between the window 151" and a display on a rear surface of the window 151", or a metal wire which is patterned directly on the rear surface of the window 151". Alternatively, the touch sensor may be integrally formed with the display. For example, the touch sensor may be disposed on a substrate of the display or within the display.

The display unit 151 may also form a touch screen together with the touch sensor. Here, the touch screen may serve as the user input unit 123 (see FIG. 1A). Therefore, the touch screen may replace at least some of the functions of the first manipulation unit 123a, 123b.

The first audio output module 152a may be implemented in the form of a receiver to transfer voice audio to a user's ear, and the second audio output module 152b may be implemented in the form of a loud speaker to output alarm sounds, multimedia audio reproduction, and the like.

The window 151a of the display unit 151 will typically include an aperture to permit audio generated by the first audio output module 152a to pass. One alternative is to allow audio to be released along an assembly gap between the structural bodies (for example, a gap between the window 151a and the front case 101). In this case, a hole independently formed to output audio sounds may not be seen or is otherwise hidden in terms of appearance, thereby further simplifying the appearance and manufacturing of the mobile terminal 100.

The optical output module 154 can be configured to output light for indicating an event generation. Examples of such events include a message reception, a call signal reception, a missed call, an alarm, a schedule notice, an email reception, information reception through an application, and the like. When a user has checked a generated event, the controller can control the optical output unit 154 to stop the light output.

The first camera 121a can process image frames such as still or moving images obtained by the image sensor in a capture mode or a video call mode. The processed image frames can then be displayed on the display unit 151 or stored in the memory 170.

The first manipulation unit 123a, 123b and the second manipulation unit 123c are examples of the user input unit 123, which may be manipulated by a user to provide input to the mobile terminal 100. The first and second manipulation units 123a,123b and 123c may also be commonly referred to as a manipulating portion, and may employ any tactile method that allows the user to perform manipulation such as touch, push, scroll, or the like. The first and second manipulation units 123a, 123b and 123c may also employ any non-tactile method that allows the user to perform manipulation such as proximity touch, hovering, or the like.

FIGS. 2 and 3 illustrate the first manipulation unit 123a, 123b as a combination of a mechanical key 123a and a touch key 123b.

Input received at the first manipulation unit 123a, 123b and the second manipulation unit 123c may be used in various ways. For example, the first manipulation unit 123a, 123b may be used by the user to provide an input to a menu, home key, cancel, search, or the like, and the second manipulation unit 123c may be used by the user to provide an input to control a volume level being output from the first or second audio output modules 152a or 152b, to switch to a touch recognition mode of the display unit 151, or the like.

As another example of the user input unit 123, a rear input unit (not shown) may be located on the rear surface of the terminal body. The rear input unit can be manipulated by a user to provide input to the mobile terminal 100. The input may be used in a variety of different ways. For example, the rear input unit may be used by the user to provide an input for power on/off, start, end, scroll, control volume level being output from the first or second audio output modules 152a or 152b, switch to a touch recognition mode of the display unit 151, and the like. The rear input unit may be configured to permit touch input, a push input, or combinations thereof.

The rear input unit may be located to overlap the display unit 151 of the front side in a thickness direction of the terminal body. As one example, the rear input unit may be located on an upper end portion of the rear side of the terminal body such that a user can easily manipulate it using a forefinger when the user grabs the terminal body with one hand. Alternatively, the rear input unit can be positioned at most any location of the rear side of the terminal body.

Embodiments that include the rear input unit may implement some or all of the functionality of the first manipulation unit 123a, 123b in the rear input unit. As such, in situations where the first manipulation unit 123a, 123b is omitted from the front side, the display unit 151 can have a larger screen.

As a further alternative, the mobile terminal 100 may include a finger scan sensor which scans a user's fingerprint. The controller 180 can then use fingerprint information sensed by the finger scan sensor as part of an authentication procedure. The finger scan sensor may also be installed in the display unit 151 or implemented in the user input unit 123.

The microphone 122 is shown located at an end of the mobile terminal 100, but other locations are possible. If desired, multiple microphones may be implemented, with such an arrangement permitting the receiving of stereo sounds.

The interface unit 160 may serve as a path allowing the mobile terminal 100 to interface with external devices. For example, the interface unit 160 may include one or more of a connection terminal for connecting to another device (for example, an earphone, an external speaker, or the like), a port for near field communication (for example, an Infrared Data Association (IrDA) port, a Bluetooth port, a wireless LAN port, and the like), or a power supply terminal for supplying power to the mobile terminal 100. The interface unit 160 may be implemented in the form of a socket for accommodating an external card, such as Subscriber Identification Module (SIM), User Identity Module (UIM), or a memory card for information storage.

The second camera 121b is shown located at the rear side of the terminal body and includes an image capturing direction that is substantially opposite to the image capturing direction of the first camera unit 121a.

The second camera 121b can include a plurality of lenses arranged along at least one line. The plurality of lenses may also be arranged in a matrix configuration. The cameras may be referred to as an "array camera." When the second camera 121b is implemented as an array camera, images may be captured in various manners using the plurality of lenses and images with better qualities.

A flash 124 is shown adjacent to the second camera 121b. When an image of a subject is captured with the camera 121b, the flash 124 may illuminate the subject.

The second audio output module 152b can be located on the terminal body. The second audio output module 152b may implement stereophonic sound functions in conjunction with the first audio output module 152a, and may be also used for implementing a speaker phone mode for call communication.

At least one antenna for wireless communication may be located on the terminal body. The antenna may be installed in the terminal body or formed by the case. For example, an antenna which configures a part of the broadcast receiving module 111 may be retractable into the terminal body. Alternatively, an antenna may be formed using a film attached to an inner surface of the rear cover 103, or a case that includes a conductive material.

A power supply unit 190 for supplying power to the mobile terminal 100 may include a battery 191, which is mounted in the terminal body or detachably coupled to an outside of the terminal body.

The battery 191 may receive power via a power source cable connected to the interface unit 160. Also, the battery 191 can be recharged in a wireless manner using a wireless charger. Wireless charging may be implemented by magnetic induction or electromagnetic resonance.

The rear cover 103 is shown coupled to the rear case 102 for shielding the battery 191, to prevent separation of the battery 191, and to protect the battery 191 from an external impact or from foreign material. When the battery 191 is detachable from the terminal body, the rear case 103 may be detachably coupled to the rear case 102.

An accessory for protecting an appearance or assisting or extending the functions of the mobile terminal 100 can also be provided on the mobile terminal 100. As one example of an accessory, a cover or pouch for covering or accommodating at least one surface of the mobile terminal 100 may be provided. The cover or pouch may cooperate with the display unit 151 to extend the function of the mobile terminal 100. Another example of the accessory is a touch pen for assisting or extending a touch input to a touch screen.

Meanwhile, the display unit 151 according to the present disclosure may be formed in a curved shape along one direction of the terminal body, and this type is referred to as a curved display unit 151, hereinafter.

This exemplary embodiment illustrates that the curved display unit 151 is curved along a lengthwise direction L of the terminal body. That is, the curved display unit 151 may have a shape that both end portions thereof adjacent to the first audio output module 152a and the microphone 122, respectively, are curved with respect to a central portion of the curved display unit 151. Unlike this, the display unit 151 may also be formed in a shape curved along a widthwise direction W of the terminal body.

In addition to the curved display unit 151 in the curved shape, the mobile terminal 100 may also be formed in the curved shape on the whole. For example, the front case 101, the rear case 102 and the rear cover 103 may have a curved shape to correspond to the curved display unit 151. In addition to those cases, various types of electronic components mounted in the mobile terminal, for example, the battery 191 may also be formed in a curved shape.

Hereinafter, the curved display unit 151 and a device structure based on the curved display unit 151 will be described in more detail with reference to the accompanying drawings.

Figure 4:
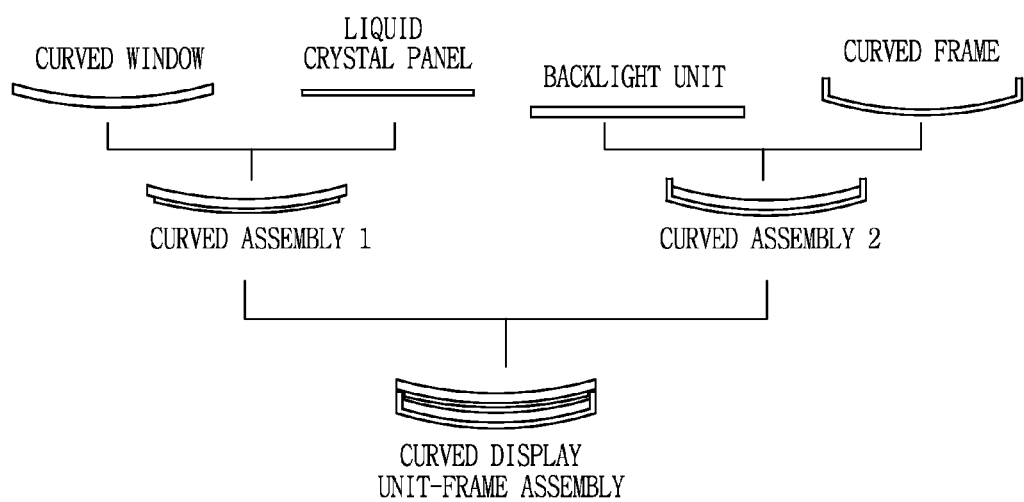
FIG. 4 is schematic view illustrating a conception that a curved display is implemented.
Figure 5:
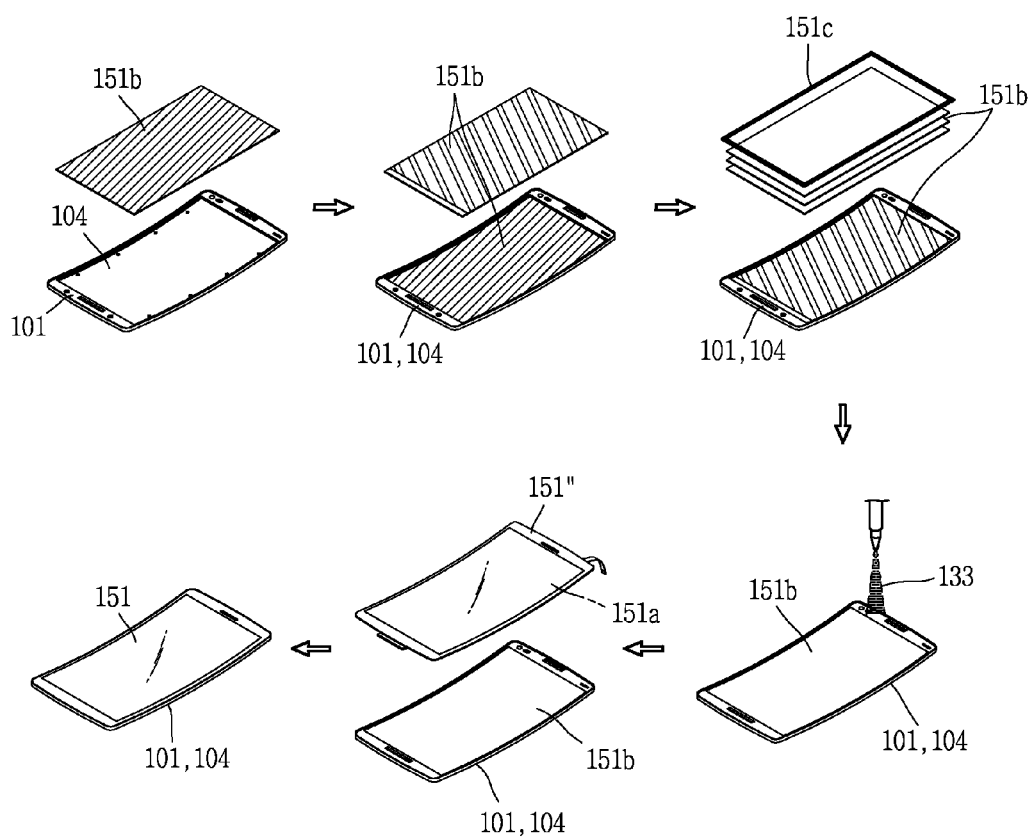
FIG. 5 is a view illustrating sequential steps of a method for fabricating a mobile terminal in accordance with the present disclosure.

FIG. 4 is a schematic view illustrating a conception that a curved display 151' is implemented, and FIG. 5 is an exemplary view illustrating sequential steps of a method for fabricating a mobile terminal 100 disclosed herein.

As illustrated in FIGS. 4 and 5, the display 151' includes a liquid crystal (LC) panel 151a on which an image is output, and a backlight unit 151b which emits light toward the LC panel 151a.

The liquid crystal panel 151a may include color filter (CF) glass and thin film transistor (TFT) glass, which are spaced apart from each other, a liquid crystal filled between the CF glass and the TFT glass, a polarizer disposed on an upper surface of the CF glass, and another polarizer disposed on a rear surface of the TFT glass.

The backlight unit 151b may include a light source, a light guide panel guiding light emitted from the light source, a reflection film disposed on a rear surface of the light guide panel, and a diffusion film and a prism sheet laminated on the light guide panel.

For the sake of explanation in the drawings, the LC panel 151a and the backlight unit 151b are merely hatched, instead of separately hatching detailed components of the LC panel 151a and the backlight unit 151b.

The LC panel 151a and the backlight unit 151b may be curved when an external force is applied thereto. For example, the LC panel 151a is fabricated in a flat shape so as to independently remain flat but may be changed into a curved shape by being attached onto a window 151" which has a curved shape. Here, the curved LC panel 151a and backlight unit 151b may have a preset curvature of radius.

The window 151" may be disposed to cover the LC panel 151a, and made of a light-transmittable material (for example, light-transmittable synthetic resin, tempered glass, etc.) such that an image output on the LC panel 151a can transmit therethrough. The window 151" may be curved in one direction. For example, the window 151" may be curved along a lengthwise direction L of a terminal main body and have a preset curvature of radius.

As illustrated, the flat LC panel 151a is attached onto a rear surface of the window 151". Accordingly, the LC panel 151a may be changed into a curved shape to correspond to the shape of the window 151". Here, the LC panel 151a may have a preset curvature of radius.

An adhesive member 131 (see FIG. 7) may be provided between the window 151" and the LC panel 151a to couple the LC panel 151a to the window 151". The adhesive member 131 may be an adhesive, such as optical clear adhesive (OCA) or optical clear resin (OCR), or an adhesive tape.

In such a manner, the LC panel 151a is curved by an external force applied thereto when it is coupled to the window 151" by use of the adhesive member 131. The window 151" generates a force making the LC panel 151a curved, namely, a bending force.

As aforementioned, the conventional flat LC panel 151a may be implemented into the curved LC panel 151a by being coupled to the window 151". The curved LC panel 151a having various curvatures can be easily implemented by adjusting the curvature of the window 151".

Meanwhile, the backlight unit 151b is attached onto a frame 101, 104. The backlight unit 151b is formed in a curved shape to correspond to the curved LC panel 151a. Here, that the backlight unit 151b is formed in the curved shape includes a case where the backlight unit 151b fabricated in a flat shape is changed into a curved shape through post-processing or an assembly process, and a case where the backlight unit 151b is fabricated in a curved shape.

A bottom surface of the frame 101, 104 on which the backlight unit 151b is attached may be formed in a curved shape along the one direction to correspond to the curved direction of the window 151". In addition, the frame 101, 104 may be formed in the curved shape on the whole. The frames 101, 104 may be made of various materials, such as a metal (for example, stainless steel, magnesium, aluminum, etc.), synthetic resin, and the like.

An adhesive member 132 (see FIG. 7) is provided between the backlight unit 151b and the frame 101, 104 to couple the backlight unit 151b to the frame 101, 104. The adhesive member 132 may be an adhesive, such as optical clear adhesive (OCA) or optical clear resin (OCR), or an adhesive tape.

In such a manner, the backlight unit 151b is curved by an external force applied thereto when it is coupled to the frame 101, 104 by use of the adhesive member 132. The frame 101, 104 generates a force making the backlight unit 151b curved, namely, a bending force.

The window 151" with the LC panel 151b attached thereto is coupled to the frame 101, 104 with the backlight unit 151b attached thereto. In the coupled state between the window 151" and the frame 101, 104, the backlight unit 151b is located on a rear surface of the LC panel 151a so as to emit light toward the LC panel 151a.

With the configuration, the LC panel 151a and the backlight unit 151b are attached onto the curved window 151" and the curved frame 101, 104, which are separate components from each other, and the window 151" and the frame 101, 104 are then coupled to each other so as to construct the curved display 151'. Therefore, it may be easier to implement the display 151' in the curved shape.

Specifically, this structure can be used for implementing the conventional liquid crystal display (LCD) into a curved display. Comparing with the case of implementing the curved display using an OLED, the case of implementing the curved display using the LCD has an advantage in view of fabricating the curved display unit with lower costs.

The implementation of the shapes of the LC panel 151a and the backlight unit 151b may not be limited to the aforementioned way. Various methods may be applied for the shape implementation. In detail, the LC panel 151a may be formed in a curved shape by a device (JIG) or a manual operation prior to being coupled to the window 151". Also, the backlight unit 151b may be fabricated in a curved shape from the beginning or first fabricated in a flat shape and thereafter changed into a curved shape by a device or a manual operation.

Hereinafter, a detailed structure of the curved display 151' will be described in more detail.

Figure 6:
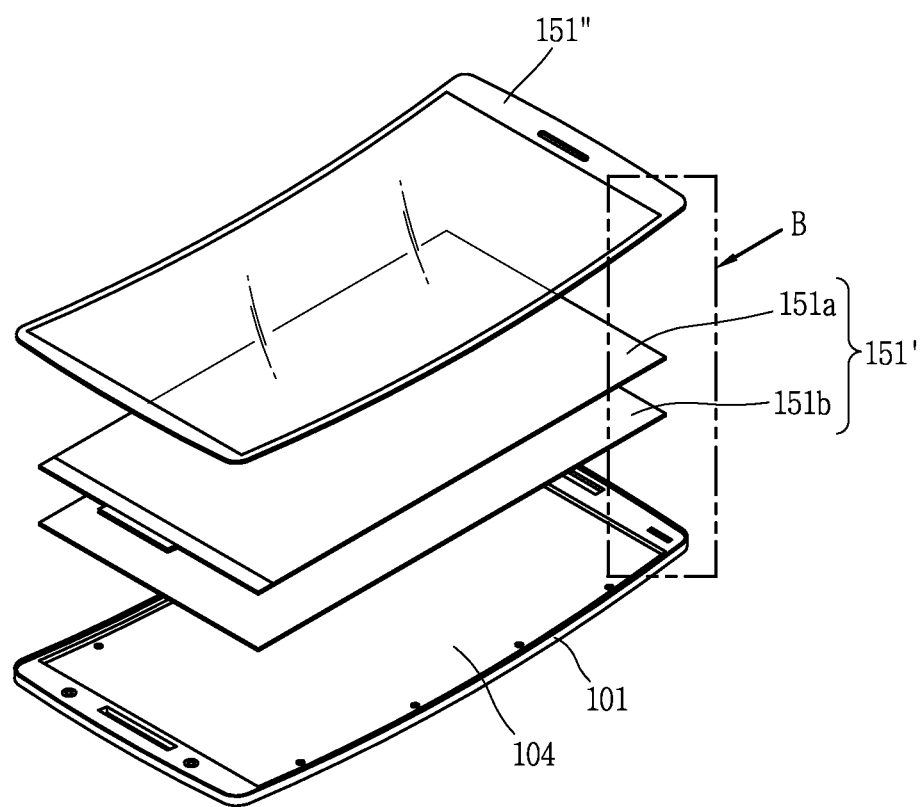
FIG. 6 is an exploded perspective view of the mobile terminal illustrated in FIG. 2.
Figure 7:
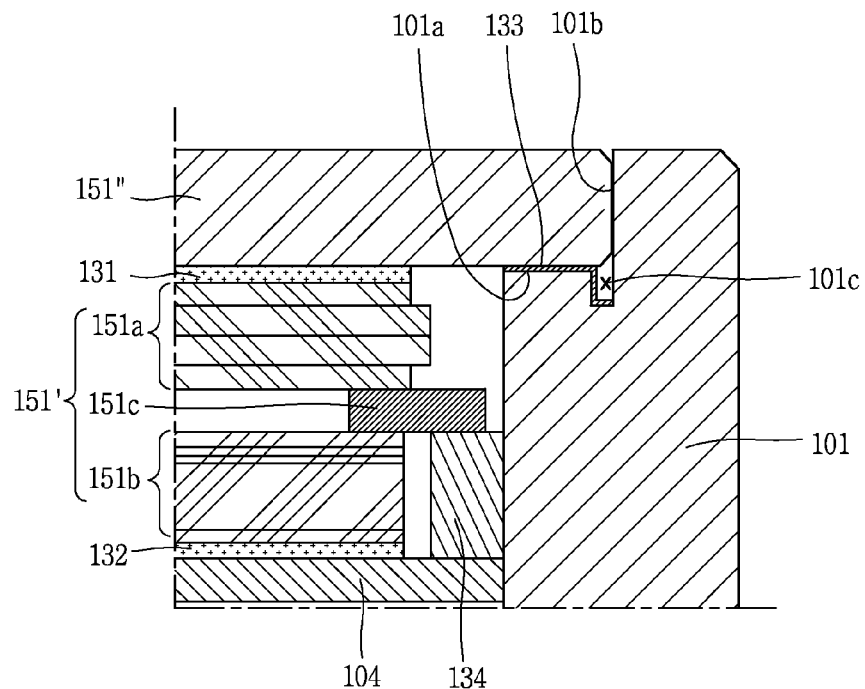
FIG. 7 is a sectional view taken along the line A-A of FIG. 2.

FIG. 6 is an exploded perspective view of the mobile terminal 100 illustrated in FIG. 2, and FIG. 7 is a sectional view taken along the line A-A of FIG. 2. For reference, the exploded perspective view of FIG. 6 merely illustrates a partial configuration associated with the present disclosure.

As illustrated in FIGS. 6 and 7, the frame 101, 104 includes a base frame 101 and a middle frame 104. The base frame and the middle frame 101 and 104 may be made of different materials. For example, the base frame 101 may be made of synthetic resin, and the middle frame 104 may be made of a metal.

The base frame 101 is coupled to the window 151". At least a part of the base frame 101 is externally exposed to define an appearance of side surfaces of the terminal main body.

The base frame 101 may include a rear surface supporting portion 101a and a side surface covering portion 101b.

The rear surface supporting portion 101a supports a rear surface of the window 151". The rear surface supporting portion 101a may have a loop shape corresponding to an edge region of the rear surface of the window 151" so as to support the edge region.

The side surface covering portion 101b is disposed to cover side surfaces of the window 151". The side surface covering portion 101b may protrude to be flush with a top (upper surface) of the window 151". With the structure, when the mobile terminal 100 is viewed from a front side, a stepped portion between the window 151" and the frames 101 and 104 may not be present, and accordingly a neat appearance of the mobile terminal 100 can be obtained.

A bonding portion 133 is provided between the base frame 101 and the window 151", to couple the window 151" to the frame 101, 104. This exemplary embodiment illustrates that the bonding portion 133 is located between the window 151" and the rear surface supporting portion 101a. The bonding portion 133 may be a bonding layer coated on the rear surface supporting portion 101a or an adhesive tape attached onto the rear surface supporting portion 101a.

When the bonding portion 133 is implemented as the bonding layer coated on the rear surface supporting portion 101a, an introduction groove 101c may be formed between the rear surface supporting portion 101a and the side surface covering portion 101b, such that the bonding layer can be introduced therein so as to be prevented from flowing to the side surfaces. In the drawings, the introduction groove 101c is formed on the rear surface supporting portion 101a.

The middle frame 104 is coupled to the base frame 101 to define a space in which the backlight unit 151b is accommodated. For example, the middle frame 104 may be formed of a metal and integrally coupled with the base frame 101 made of synthetic resin through insert-injection.

Figure 8:
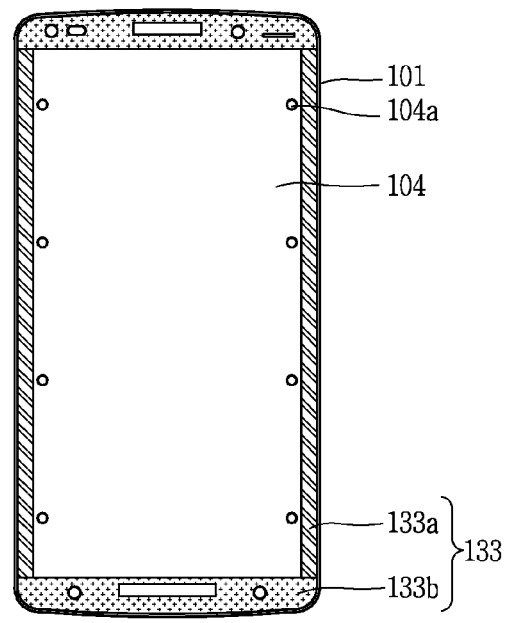
FIG. 8 is a planar view of a frame illustrated in FIG. 6.
Figure 9:
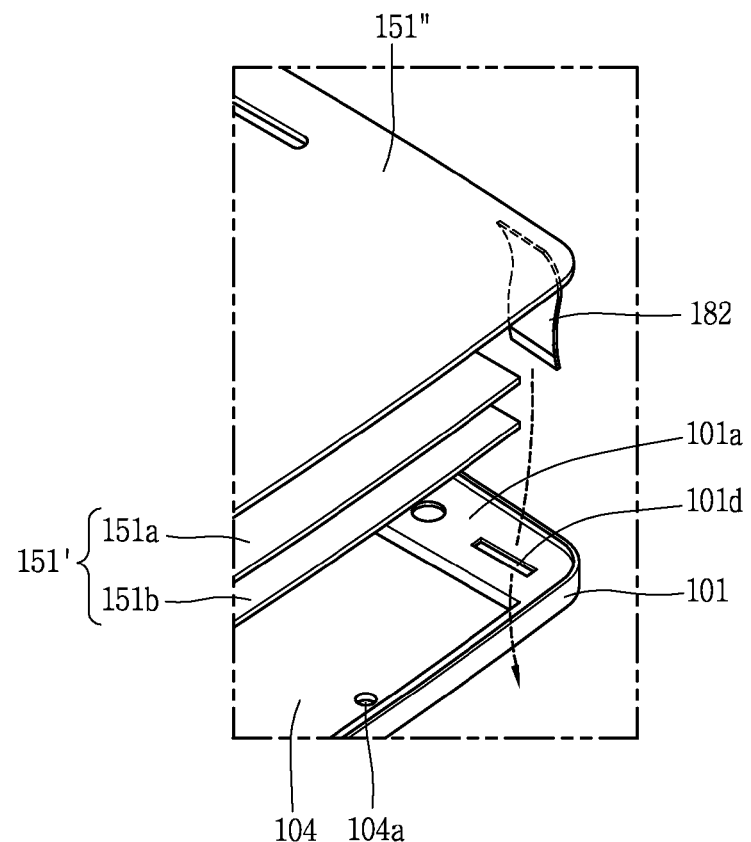
FIG. 9 is an enlarged view of a part B illustrated in FIG. 6.

Radiation holes 104a for radiating heat may be formed through the middle frame 104. With the formation of the radiation holes 104a through the middle frame 104, heat generated from the backlight unit 151b can be discharged to the rear surface of the middle frame 104. FIGS. 8 and 9 exemplarily illustrate that the radiation holes 104a are formed along edges of the side surfaces of the middle frame 104 with predetermined intervals.

Meanwhile, this embodiment illustrates that the middle frame 104 is separately provided from the base frame 101. However, the structure of the frame 101, 104 may not be limited to this. The base frame 101 and the middle frame 104 may be formed as a single member. For example, the base frame 101 and the middle frame 104 may be integrally formed with each other through injection molding.

The backlight unit 151b is coupled to the middle frame 104. The middle frame 104 to which the backlight unit 151b is attached is formed in a curved shape in one direction. FIG. 6 exemplarily illustrates that the backlight unit 151b fabricated in a flat shape is changed into a curved shape by a bending force, applied thereto due to the curved shape of the middle frame 104, when it is attached onto the middle frame 104.

However, the backlight unit 151b may not always obtain such curved shape by the coupling structure. The backlight unit 151b may be fabricated in a curved shape along the one direction, or be changed into a curved shape along the one direction before being attached onto the middle frame 104 and coupled to the middle frame 104.

In such a manner, by employing the structure that the backlight unit 151b is attached onto the bottom surface of the middle frame 104, a gap between the middle frame 104 and the backlight unit 151b may be removed, thereby making the mobile terminal 100 slimmer.

Meanwhile, a reflecting portion which reflects light leaked from the backlight unit 151b is provided within the frame 101, 104. FIG. 7 exemplarily illustrates, as the reflecting portion, a reflection member 134 which is coupled to the frame 101, 104 to surround side surfaces of the backlight unit 151b. To allow the reflection member 134 to reflect light, the reflection member 134 may be formed of white-based synthetic resin or formed to have high brightness through post-processing, such as coating, deposition and the like.

As illustrated, the reflection member 134 may be disposed along the edge portion between the base frame 101 and the middle frame 104. The reflection member 134 may also be integrally coupled with the frame 101, 104 through double-injection or triple-injection.

The middle frame 104 may be formed of a material with high brightness or formed to have high brightness through post-processing, such as coating, deposition and the like, so as to reflect light leaked from the backlight unit 151b.

In such a manner, by employing the structure that the reflecting portion is provided within the frame 101, 104, a white mold which has been provided on the conventional backlight unit 151b may be removed, thereby reducing a gap between side surfaces of the frame 101, 104 and the backlight unit 151b. Consequently, a bezel may be reduced, and the mobile terminal 100 can be provided with a larger screen based on the same area.

In the meantime, the window 151" with the LC panel 151a attached thereto is coupled to the frame 101, 104 with the backlight unit 151b attached thereto. In the coupled state between the window 151" and the frame 101, 104, the backlight unit 151b is located on the rear surface of the LC panel 151a. Here, a predetermined gap may be generated between the LC panel 151a and the backlight unit 151b.

A shielding member 151c for preventing a leakage of light from the backlight unit 151b is provided between the LC panel 151a and the backlight unit 151b. The shielding member 151c is formed in a loop shape extending along an upper edge of the backlight unit 151b, so as to separate an inner space between the LC panel 151a and the backlight unit 151b from an outer space.

The drawing (FIG. 7) illustrates that the shielding member 151c covers (shields) the upper edge of the backlight unit 151b and the reflection member 134. In order for the shielding member 151c to be stably mounted on the backlight unit 151b and the reflection member 134, the reflection member 134 preferably protrudes to be flush with the top of the backlight unit 151b.

The shielding member 151c may be closely adhered onto the LC panel 151a and the backlight unit 151b, respectively, to prevent an introduction of foreign materials between the LC panel 151a and the backlight unit 151b. The shielding member 151c is preferably formed of a material which is elastically deformable (for example, silicon, rubber, etc.). Also, to prevent a generation of spots on the LC panel 151a and breakage of the LC panel 151a or the backlight unit 151b due to being pressed when the shielding member 151c is closely adhered, the shielding member 151c is thicker than the gap between the LC panel 151a and the backlight unit 151b. Here, the thickness of the shielding member 151c should be decided by taking into account an elastically-deformable degree of the shielding member 151c.

As such, the employment of the shielding member 151c attached to the LC panel 151a and the backlight unit 151b, respectively, may result in preventing the leakage of light generated from the backlight unit 151b and the introduction of foreign materials between the LC panel 151a and the backlight unit 151b.

FIG. 8 is a planar view of the frame 101, 104 illustrated in FIG. 6.

As aforementioned, only the flat LC panel 151a is attached onto the curved window 151". This structure applies a less force to the window 151" [that is, a force of deforming the window 151" into a flat shape], as compared with the structure that both of the flat LC panel 151a and the flat backlight unit 151b are attached to the curved window 151".

Therefore, the window 151" may be maintained in the curved state without a great change in shape, and also maintained in a stably-coupled state to the curved frame 101, 104. According to the structure, the bonding portion 133 may be configured in a different manner. Hereinafter, one example of the bonding portion 133 will be described.

As illustrated in FIG. 8, the bonding portion 133 may be disposed on the rear surface supporting portion 101a of the base frame 101. Both sides of the rear surface supporting portion 101a corresponding to a widthwise direction W of the terminal main body may have a thinner and longer area than both ends of the rear surface supporting portion 101a corresponding to a lengthwise direction L of the terminal main body.

Meanwhile, to coat the bonding layer on the rear surface supporting portion 101a, the least area for controlling the flow of liquid is required. However, the area of both sides of the rear supporting portion 101a is too small to coat the bonding layer, especially by considering the trend of the mobile terminal 100 that the lateral bezel is decreased.

Hence, the bonding portion 133 may be configured by a combination of an adhesive tape 133a provided on the both sides of the rear surface supporting portion 101a and a bonding layer 133b provided on the both ends of the rear surface supporting portion 101a. Since a bonding force of the bonding layer 133b is greater than an adhesive force of the adhesive tape 133a, the coupling between the window 151" and the base frame 101 may generally be enabled by the bonding layer 133b, and the adhesive tape 133a may assist the coupling.

As illustrated, the adhesive tape 133a may extend from one end to the other end of the rear surface supporting portion 101a.

FIG. 9 is an enlarged view of a part B illustrated in FIG. 6.

The display 151' is interlayered with or integrally formed with a touch sensor, to implement a touch screen. The touch screen may provide an input interface as well as an output interface between the mobile terminal 100 and a user.

FIG. 9 exemplarily illustrates that the touch sensor may be formed or attached on the rear surface of the window 151" and a flexible printed circuit board 182 electrically connected with the touch sensor is provided on one end portion of the window 151".

The base frame 101, in detail, the rear surface supporting portion 101a is provided with a hole 101d through which the flexible printed circuit board 182 is inserted. The flexible printed circuit board 182 may be inserted through the hole 101d so as to be electrically connected with a printed circuit board (not illustrated) disposed on the rear surface of the middle frame 104.

As aforementioned, the bonding portion 133 is provided on the rear surface supporting portion 101a to couple the window 151" to the frame 101, 104. In order for the flexible printed circuit board 182 to be directly inserted through the hole 101d without being bent when the window 151" is mounted on the rear surface supporting portion 101a, the hole 101d is formed at a position corresponding to the flexible printed circuit board 182. This structure may allow for an increased area of the bonding portion 133 on the rear surface supporting portion 101a.

Figure 10:
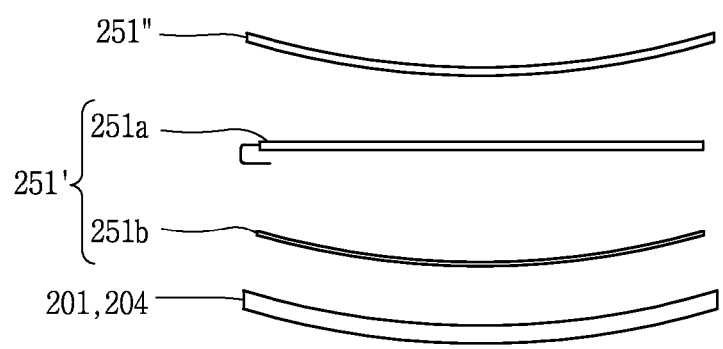
FIG. 10 is an exploded view illustrating another embodiment of a mobile terminal in accordance with the present disclosure.

FIG. 10 is an exploded view illustrating another embodiment of a mobile terminal 200 disclosed herein.

As illustrated in FIG. 10, a flat LC panel 251a is attached onto a rear surface of a window 251" so as to be curved to correspond to the shape of the window 251". Here, a bending force is applied to the LC panel 251a due to the curved shape of the window 251".

On the other hand, the backlight unit 251b has a curved shape to some degree to correspond to a curved shape of a frame 201, 204 before being attached onto the frame 201, 204. For example, the backlight unit 251b may be fabricated in a curved shape along one direction, or changed into a curved shape along the one direction before being attached to the frame 201, 204 through a device (JIG) or a manual operation.

The backlight unit 251b may be curved to correspond to the curved frame 201, 204 or less. In such a manner, the curved backlight unit 251b is attached onto the frame 201, 204.

While the backlight unit 251b is coupled to the frame 201, 204, a curved degree of the backlight unit 251b is substantially the same as that illustrated in the forgoing description. Here, since the backlight unit 251b already has the curved shape before being attached onto the frame 201, 204, the bending force applied to the backlight unit 251*b* due to the curved shape of the frame 201, 204 and a restoring force of the backlight unit 251*b*, which is generated due to the backlight unit 251*b* being curved, are reduced more than the previous embodiment. According to this coupling structure, an area occupied by an adhesive member for coupling the backlight unit 251*b* to the frame 201, 204 may be decreased.

Figure 11:
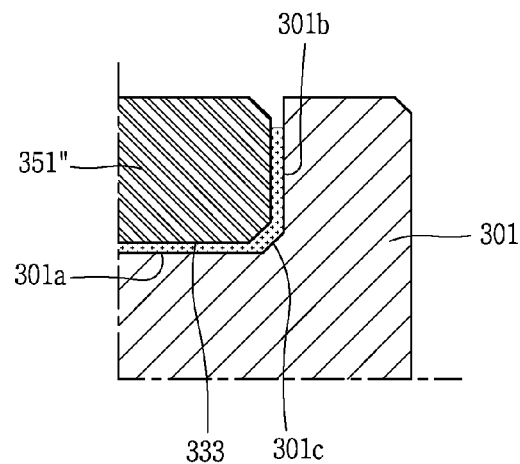
FIG. 11 is a sectional view illustrating another embodiment of a mobile terminal in accordance with the present disclosure, which illustrates a coupling structure between a window and a frame.

FIG. 11 is a sectional view illustrating another embodiment of a mobile terminal 300 disclosed herein, which illustrates a coupling structure between a window 351" and a frame 301, 304.

As illustrated in FIG. 11, a bonding layer 333 for coupling a window 351" to a base frame 301 is provided between a rear surface of the window 351" and a rear surface supporting portion 301*a* and between a side surface of the window 351" and a side surface covering portion 301*b*, respectively. That is, unlike the previous embodiment, the bonding layer 333 is also provided between the side surface of the window 351" and the side surface covering portion 301*b* so as to increase a bonding force by virtue of an increased bonding region.

To implement this, a method of coating the bonding layer 333 on the rear surface supporting portion 301*a* and the side surface covering portion 301*b* during a fabricating process may be considered. However, it is difficult to coat the bonding layer 333 on the side surface covering portion 301*b* which is thin, and additionally the bonding layer 333 coated on the side surface covering portion 301*b* may partially be leaked out when the window 351" is coupled to the base frame 301.

To prevent this, an inclined guide portion 301*c* may be formed between the rear surface supporting portion 301*a* and the side surface covering portion 301*b*, and the bonding layer 333 may be coated only on the rear surface supporting portion 301*a*. Accordingly, when the window 351" is bonded to the base frame 301, the bonding layer 333 coated on the rear surface supporting portion 301*a* is introduced toward the side surface covering portion 301*b* along the inclined guide portion 301*c*. Consequently, the bonding layer 333 may be coated entirely on the rear surface supporting portion 301*a* and the side surface covering portion 301*b* so as to increase the bonding region, thereby enhancing the bonding force between the window 351" and the base frame 301.

Figure 12:
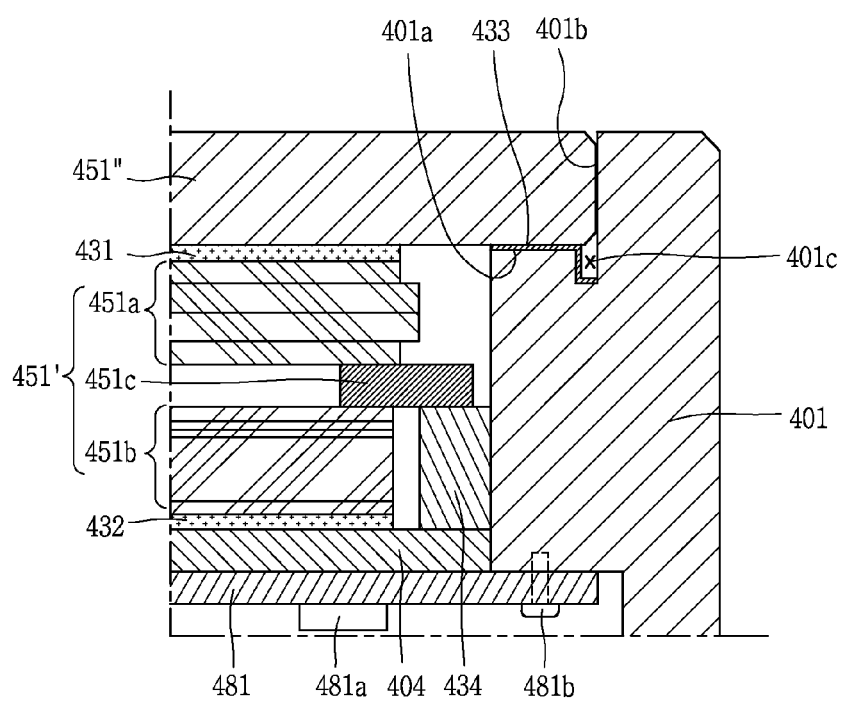
FIG. 12 is a sectional view illustrating another embodiment of a mobile terminal in accordance with the present disclosure, which illustrates a supporting structure of a middle frame.

FIG. 12 is a sectional view illustrating another embodiment of a mobile terminal 400 disclosed herein, which illustrates a supporting structure of a middle frame 404.

As illustrated in FIG. 12, a middle frame 404 coupled to a base frame 401 defines a bottom surface for mounting a backlight unit 451*b*. The middle frame 404 may be made of a metal in a plate shape, and integrally coupled with the base frame 401 made of synthetic resin through insert-injection.

Meanwhile, a printed circuit board 481 may be coupled to the base frame 401 so as to cover a rear surface of the middle frame 404. That is, the printed circuit board 481 is configured to support the middle frame 404. The structure may prevent drooping of the middle frame 404 due to a weight of the backlight unit 451*b* and a thusly-caused breakage at the coupled portion between the middle frame 404 and the base frame 401.

The printed circuit board 481 may be fixed to the base frame 401 by a coupling member 481*b*, which is coupled to the base frame 401 through the printed circuit board 481, or by a hook structure provided on the base frame 401.

The printed circuit board 481 may be disposed to cover all or at least a part of the rear surface of the middle frame 404, and have a curved shape to correspond to a curved shape of the middle frame 404.

Electronic components 481*a* are preferably mounted on the other surface of the printed circuit board 481, other than one surface of the printed circuit board 481 facing the rear surface of the middle frame 404.

Figure 13:
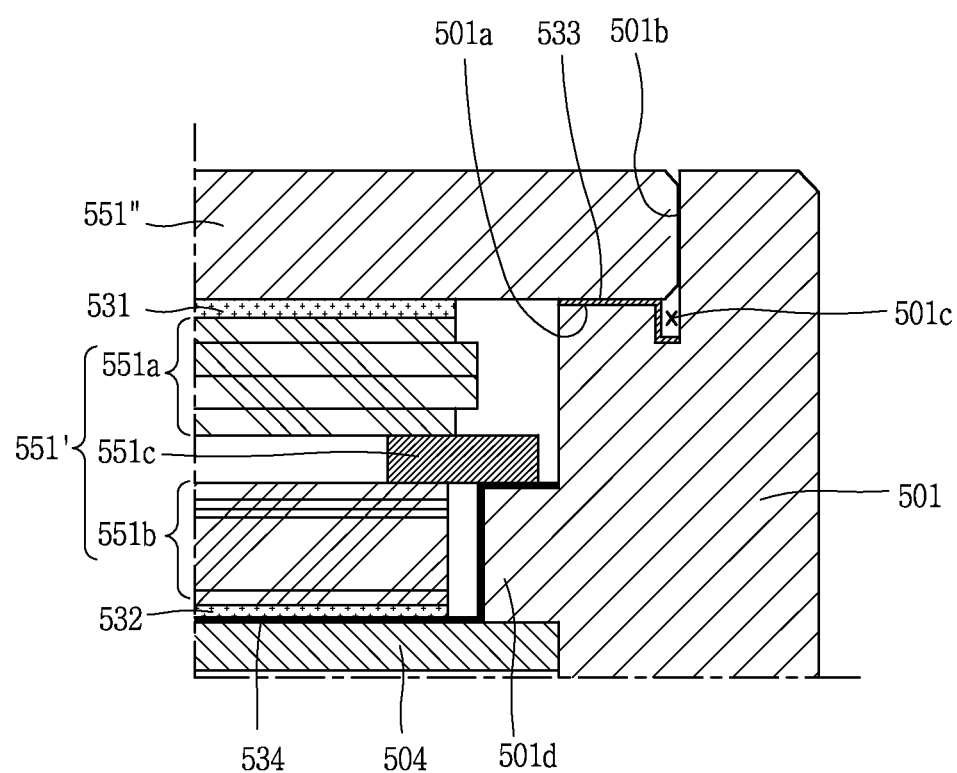
FIG. 13 is a sectional view illustrating another embodiment of a mobile terminal in accordance with the present disclosure, which illustrates another example of a reflecting portion.

FIG. 13 is a sectional view illustrating another embodiment of a mobile terminal 500 disclosed herein, which illustrates another example of a reflecting portion.

As illustrated in FIG. 13, a reflecting portion for reflecting light leaked from a backlight unit 551*b* is provided within a frame 501, 504. Unlike the previous embodiment in which the reflecting portion is implemented as the reflection member 134, the reflecting portion according to this embodiment is implemented as a reflecting layer 534 which is coated on at least a part of an inner side of the frame 501, 504.

The reflecting layer 534 contains a material having a characteristic of reflecting light. For example, the reflecting layer 534 may contain glass beads.

The reflecting layer 534 may be coated on an inner wall of a base frame 501 facing a side surface of the backlight unit 551*b* and a bottom surface of the middle frame 504. Or, the reflecting layer 534 may be coated only on the inner wall of the base frame 501, and the middle frame 501 may be formed of a material with high brightness or formed to have high brightness through post-processing, such as coating, deposition and the like, so as to reflect light leaked from the backlight unit 551*b*.

Meanwhile, the inner wall of the base frame 501 may be provided with a protruding portion 501*d* which protrudes toward the side surface of the backlight unit 551*b*. The reflecting layer 534 may be coated on the protruding portion 501*d*. In order for a shielding member 551*c* to be stably attached onto the backlight unit 551*b* and the protruding portion 501*d*, the protruding portion 501*d* preferably protrudes to be flush with a top of the backlight unit 551*b*.

The structure proposed in association with one embodiment of those aforementioned structures may be applied equally to a mobile terminal of another embodiment, unless otherwise logically contradictory. For example, the embodiment of FIG. 13 exemplarily illustrates the structure that the reflecting portion is implemented as the reflecting layer 534. This structure may also be applied as a structure of substituting the reflection member 134 of another embodiment.

As the present features may be embodied in several forms without departing from the characteristics thereof, it should also be understood that the above-described embodiments are not limited by any of the details of the foregoing description, unless otherwise specified, but rather should be construed broadly within its scope as defined in the appended claims, and therefore all changes and modifications that fall within the metes and bounds of the claims, or equivalents of such metes and bounds are therefore intended to be embraced by the appended claims.

What is claimed is:

1. A mobile terminal comprising:
a case forming an inner space;
a liquid crystal panel;
a backlight unit located at a rear surface of the liquid crystal panel and configured to emit light toward the liquid crystal panel;
a curved window located to cover the liquid crystal panel, the curved window being formed to have a curved shape along one direction; and
a frame configured to support the window, wherein the liquid crystal panel is attached to a rear surface of the window and has a curved shape to correspond to the curved window, wherein the frame includes:
a base frame coupled to the window; and
a middle frame made of a metal and integrally coupled with the base frame through an insert-injection process, and wherein the base frame includes:
a side surface covering portion covering side surfaces of the window;
a rear surface supporting portion supporting a portion of a rear surface of the window, the portion of the rear surface of the window being adjacent to at least one of the side surfaces of the window;
a bonding portion provided on the side surface covering portion and the rear surface supporting portion to couple the window to the frame; and
an introduction groove formed as a recessed portion between the rear surface supporting portion and the side surface covering portion.

2. The mobile terminal of claim 1, wherein a bottom surface of the frame has the backlight unit attached thereto, the bottom surface having a curved shape along the one direction.

3. The mobile terminal of claim 2, wherein the backlight unit receives a bending force applied thereto due to the curved shape of the bottom surface.

4. The mobile terminal of claim 2, wherein the backlight unit is fabricated in a curved shape along the one direction or is changed into the curved shape along the one direction before being attached to the frame.

5. The mobile terminal of claim 1, wherein the bonding portion includes:
adhesive tape attached to the rear surface supporting portion at opposite sides of the window to extend along the one direction; and
a bonding layer coated on opposite ends of the window extending along a second direction perpendicular to the one direction.

6. The mobile terminal of claim 1, further comprising a terminal main body,
wherein the base frame is externally exposed to define an appearance of side surfaces of the terminal main body.

7. The mobile terminal of claim 1, further comprising:
a printed circuit board coupled to the base frame and configured to support the middle frame by covering a rear surface of the middle frame.

8. The mobile terminal of claim 1, wherein an inclined guide portion is located between the rear surface supporting portion and the side surface covering portion, the inclined guide portion being arranged to allow the bonding portion coated on the rear surface supporting portion to be applied to the side surface covering portion when the window is coupled to the base frame.

9. The mobile terminal of claim 1, further comprising:
a reflecting portion located within the frame to surround the backlight unit, the reflecting portion being configured to reflect light leaked from the backlight unit.

10. The mobile terminal of claim 9, wherein the reflecting portion is a reflecting layer coated on at least a part of an inner side of the frame.

11. The mobile terminal of claim 9, wherein the reflecting layer is coated on an inner wall of the base frame and a bottom surface of the middle frame, the inner wall of the base frame facing a side surface of the backlight unit.

12. The mobile terminal of claim 9, wherein the reflecting portion is a reflection member coupled to the frame to surround side surfaces of the backlight unit, the reflection member being made of white-based synthetic resin.

13. The mobile terminal of claim 12, wherein the reflection member is disposed on an edge portion between the base frame and the middle frame.

14. The mobile terminal of claim 13, wherein the reflection member is integrally coupled with the frame through double-injection processing or triple-injection processing.

15. The mobile terminal of claim 12, further comprising a shielding member located between the liquid crystal panel and the backlight unit, the shielding member being configured to prevent a leakage of light from the backlight unit.

16. The mobile terminal of claim 15, wherein the shielding member is located to cover an upper edge of the backlight unit and the reflection member.

17. The mobile terminal of claim 15, wherein the shielding member is formed of an elastically deformable material and adhered onto the liquid crystal panel and the backlight unit to prevent an introduction of foreign materials between the liquid crystal panel and the backlight unit.

18. The mobile terminal of claim 1,
wherein a portion of the middle frame is disposed in the inner space and overlapping the window,
wherein the backlight unit is attached on one surface of the middle frame and has a curved shape to correspond to the curved shape of the liquid crystal panel, and
wherein the base frame and the middle frame are fixed to each other so that the liquid crystal panel and the backlight unit overlap each other.

* * * * *